Sept. 12, 1950 W. G. OTTO 2,521,868
CUTTERHEAD WITH CONSTANT LENGTH RETAINING CUTTERS
Filed June 18, 1947
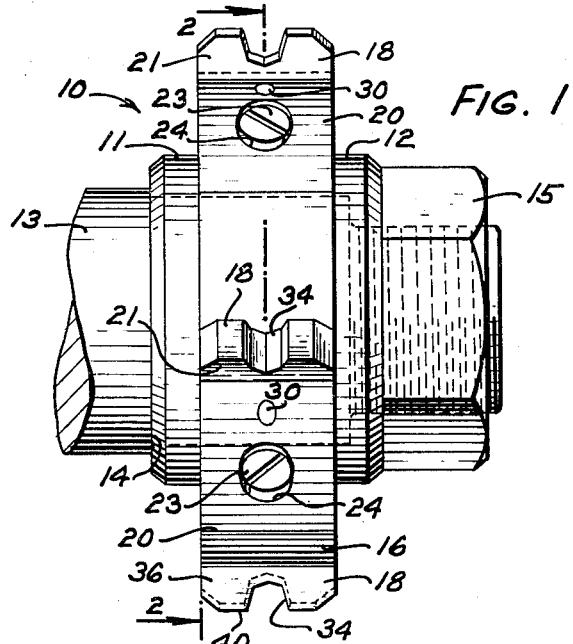
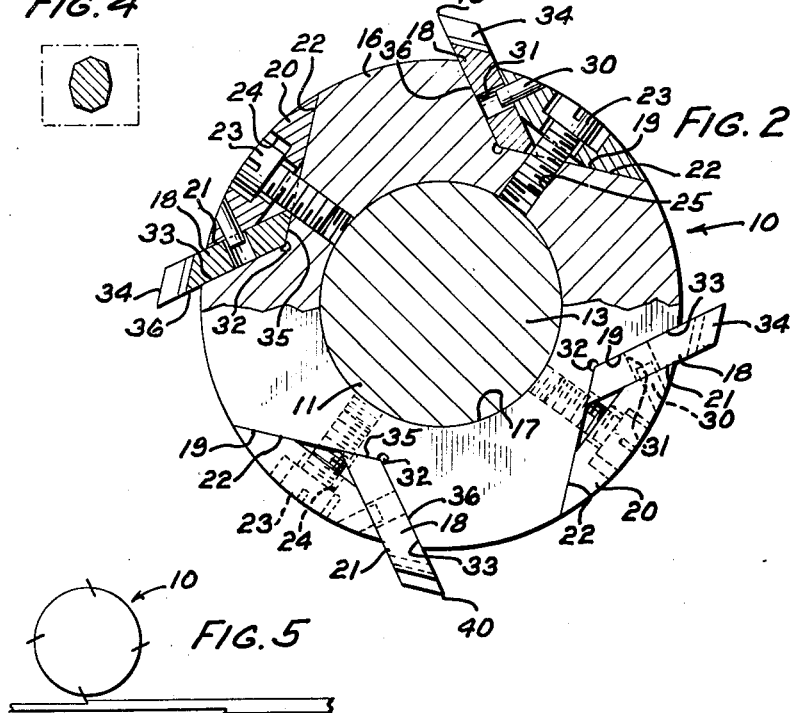
INVENTOR
W. G. OTTO
BY *E. F. Kane*
ATTORNEY Patented Sept. 12, 1950

2,521,868

UNITED STATES PATENT OFFICE 2,521,868

CUTTERHEAD WITH CONSTANT-LENGTH RETAINING CUTTERS

Willard G. Otto, Downers Grove, Ill., assignor to Western Electric Company, Incorporated, New York, N. Y., a corporation of New York Application June 18, 1947, Serial No. 755,352

1 Claim. (Cl. 144—230)

This invention relates to shaping cutters and more particularly to a cutter head with constant length retaining cutters.

Heretofore, it has been possible to sharpen the dulled cutting edges of a rotary shaping cutter, but in doing so, even though the ground form of the cutter could be maintained, the radius distance of the cutting edge to the center of rotation of the shaping tool will be reduced due to the grinding away of the cutter stock. There are, however, applications where it would be most desirable and advantageous to grind the cutting edges of rotary cutting tools and maintain constant not only the form, but also the diameter.

An object of this invention is to provide a new and efficient shaper cutter whose cutting members will maintain a constant form and constant position regardless of the number of times they are sharpened.

In accordance with one embodiment of this invention a rotating shaper cutter is provided with a plurality of removable cutting members secured, by wedge clamps, in V-shaped notches transversely cut in the rim of an annular frame. The ground form of each cutting member is parallel to the base of the cutting member, and the angle between the base and the forward or cutting face of the cutting member is the same as the angle between the sides of the V-notch so that if the cutting member is sharpened by honing or grinding its forward face, the ground form will remain constant and the diametric position of the cutting edge will always remain constant regardless of the number of times it is sharpened.

A complete understanding of this invention will be had by referring to the following detailed description taken in conjunction with the accompanying drawing, in which:

Fig. 1 is a front elevation of one embodiment of the invention showing the shaper cutter mounted on the shaft of a shaping machine;

Fig. 2 is a side elevation partly in section of the apparatus shown in Fig. 1 taken on the line 2—2 of that figure;

Fig. 3 is a cross-sectional view of a piece of material shaped by the apparatus shown in Fig. 1;

Fig. 4 is a cross-sectional view of a piece of material processed from both sides by a pair of oppositely rotating shaper cutters as shown diagrammatically in Fig. 5; and Fig. 5 is a diagrammatic showing of a pair of oppositely rotating shaper cutters working on both sides of a piece of material.

In the accompanying drawing, a shaper cutter 10 embodying features of the invention is shown clamped between a pair of collars 11 and 12 on a rotatable shaft 13 which may be part of a wood shaping or molding machine, not shown. The cutter and collars are rigidly fixed between an annular shoulder 14 on the shaft 13 and a nut 15 screwed on the threaded end of the shaft 13.

The particular ground form of the cutting members shown is adapted to shape wood or other material stock to the cross section shown in Fig. 3. A dowel rod having the cross section shown in Fig. 4 may be shaped by using a pair of oppositely revolving shaper cutters as shown diagrammatically in Fig. 5 to work on both sides of the material stock. The amount of stock removed by the cutting members is indicated by the dot and dash lines in Figs. 3 and 4.

As will be seen in the drawing an annular cutter holder 16 provided with a central aperture 17 for shaft-mounting provides support for a plurality of cutting members 18 which are disposed in V-shaped notches 19 extending transversely across the periphery of the cutter holder 16. Each of the cutting members 18 is firmly held in place by a clamping shoe 20 which is forced against the back face 21 of the cutting member and the back part 22 of the V-shaped notch 19 by means of a flat head machine screw 23 which passes through an elongated and counter-sunk aperture 24 formed in the clamping shoe 20 is screwed into a threaded aperture 25 in the frame 16. A safety pin 30 attached to the clamping shoe 20 extends into an aperture 31 formed in the cutting member 18 in order to prevent the cutting member from flying out of its position in case it becomes loose while the cutter is rotating. To prevent misalignment due to dirt, etc., in the apex of the V-shaped notches, the apex of each notch may be slightly undercut as shown at 32.

Each of the notches 19 in the cutter holder 16 is defined by a pair of walls 22 and 33, the wall 22 being disposed parallel to the ground form 34 of the cutting member 18 when the cutting member is mounted in the notch and the wall 33 being disposed at the hook angle or top rake angle of the cutting member in position in the notch. The oppositely disposed surfaces of the cutting member 18 are parallel one to another so that when the cutting member is in proper position its base 35 rests on the wall 22 of the notch 19 and its forward face 36, which is flat, is contiguous to and parallel with the wall 33 of the notch, which wall is on the line of the desired hook angle of the cutting member 18.

To sharpen a cutting member 18 it is removed from the cutter holder 16 and its forward face 36 is either ground or honed until the cutting edge 40 of the member attains the desired degree of sharpness. It is important that the original angular relationships between the faces and ends of the cutting member be the same before and after the grinding or honing of the forward face 36. After sharpening, the cutting member 18 is replaced and clamped in the notch 19 with its forward face 36 again contiguous to and parallel with the wall 33 of the notch 19 and its base 35 lying flat on the surface of the wall 22 of the notch. It will be seen that after sharpening, even though the thickness of the cutting member 18 has been reduced, the ground form 34 will remain constant and the relative position of the cutting edge 40 with respect to the axis of rotation will remain unchanged.

What is claimed is:

A shaper cutter comprising a cutting member having a first flat face and a second flat face forming a predetermined obtuse dihedral angle and a third face disposed opposite to said second face and adjacent said first face, said third face of said cutting tool being disposed at an acute angle relative to the first face thereof and forming therewith a cutting edge, said third face sloping relative to said first face in the same direction as said second face and with any line in said third face formed by a plane perpendicular to said first face and said second face and intersecting said third face, being parallel to said second face, a substantially cylindrical cutter holder rotatable about an axis passing therethrough and having a V-shaped tool receiving notch therein formed by a flat first face and a flat second face forming an obtuse dihedral angle similar to said obtuse dihedral angle of said tool and meeting at a line parallel to the axis of said cutter holder, said V-shaped notch extending inwardly from the periphery of said holder with the line formed by said two flat surfaces being disposed intermediate the axis and the periphery of said holder, and means for clamping said cutting member in said notch with the dihedral of the tool coinciding with the dihedral of the holder and with the first face of the member engaging with the first face of the notch of the holder, said first face of said notch forming a predetermined hook angle with a plane drawn from the cutting edge of said member in assembled operative position in said cutter holder through said axis.

WILLARD G. OTTO.

REFERENCES CITED

The following references are of record in the file of this patent:

UNITED STATES PATENTS

| Number | Name | Date |
|---|---|---|
| 237,652 | Woods | Feb. 8, 1881 |
| 707,035 | Tindel | Aug. 12, 1902 |
| 999,014 | De Laney | July 25, 1911 |
| 1,451,995 | Madsen | Apr. 17, 1923 |